United States Patent [19]

Hornak et al.

[11] Patent Number: 4,643,867
[45] Date of Patent: Feb. 17, 1987

[54] REFUELING MACHINE MOUNTED FUEL ASSEMBLY INSPECTION T.V. CAMERAS

[75] Inventors: Leonard P. Hornak, N. Huntingdon; Robert E. Meuschke, Pittsburgh; James R. Marshall, Penn Hills, all of Pa.

[73] Assignee: Westinghouse Electric Corp., Pittsburgh, Pa.

[21] Appl. No.: 553,600

[22] Filed: Nov. 21, 1983

[51] Int. Cl.⁴ .................. G21C 17/08; H04N 7/18
[52] U.S. Cl. .................... 376/248; 358/100; 358/229
[58] Field of Search ............ 358/99, 100, 229; 376/248, 268, 271

[56] References Cited

U.S. PATENT DOCUMENTS

| | | | |
|---|---|---|---|
| 2,981,073 | 4/1961 | Robinson, Jr. | 358/99 |
| 3,066,969 | 12/1962 | Camac | 358/100 |
| 3,077,361 | 2/1963 | Tait et al. | 358/100 |
| 3,114,798 | 12/1963 | Jackson | 358/100 |
| 3,114,799 | 12/1963 | Waters et al. | 358/100 |
| 3,145,636 | 8/1964 | Hall et al. | 358/100 |
| 3,737,372 | 6/1973 | Debergh et al. | 376/248 |
| 3,761,623 | 9/1973 | Hara et al. | 358/100 |
| 4,051,525 | 9/1977 | Kelly | 358/100 |
| 4,190,857 | 2/1980 | Creek et al. | 358/100 |
| 4,311,557 | 1/1982 | Kowalski et al. | 376/271 |
| 4,331,975 | 5/1982 | Krauza et al. | 358/100 |
| 4,424,531 | 1/1984 | Elter et al. | 358/100 |
| 4,460,302 | 7/1984 | Moreau et al. | 358/100 |
| 4,504,857 | 3/1985 | Miller et al. | 358/99 |

FOREIGN PATENT DOCUMENTS

| | | | |
|---|---|---|---|
| 874226 | 8/1961 | United Kingdom . | |
| 897449 | 5/1962 | United Kingdom . | |
| 1058851 | 2/1967 | United Kingdom | 376/268 |
| 1074282 | 7/1967 | United Kingdom . | |
| 1097918 | 1/1968 | United Kingdom | 376/248 |

OTHER PUBLICATIONS

Vertut et al., "MA-23M Contained Servo-Manipulator With Television Cameras on PICA and PIADE Telescopic Supports With Computerized Integrated Control, " Remote Systems Technology (Prog. of 28th Conf.) vol. ½, pp. 13-19, 1980.

Primary Examiner—Deborah L. Kyle
Assistant Examiner—Richard L. Klein
Attorney, Agent, or Firm—Daniel C. Abeles

[57] ABSTRACT

A refueling machine (10, 100) within a nuclear reactor facility includes an outer stationary mast (12, 112) upon which are mounted a plurality of light sources (28, 128), inclined mirrors (36, 136), and television cameras (24, 124) for scanning a fuel assembly (32) for the existence of any defects or damage as the fuel assembly (32) is being withdrawn from the reactor core into the stationary mast (12, 112). In a first embodiment, the light sources (28), mirrors (36), and cameras (24) are mounted upon a sleeve (14) clamped about the lower end of the stationary mast (12), while in a second embodiment, the light sources (128), mirrors (136), and cameras (124) are mounted upon a basket-type framework (178) which is suspendingly supported upon the stationary mast (112) by support cables (158). A fixture (176) can support the framework (178) in an off-the-mast mode so as to permit remote-controlled maintenance or repair of the light sources (128), mirrors (136), or cameras (124). The mirrors (36, 136) may be eliminated and the light sources re-oriented so as to illuminate the reactor core and thereby facilitate the insertion of a fuel assembly (32) within the reactor core. Television monitors and tape recorder apparatus (168) are disposed upon the refueling machine trolley (150) for remote viewing of the scanned fuel assembly or viewing of the reactor core during an insertion mode of the refueling operation.

4 Claims, 4 Drawing Figures

REFUELING MACHINE MOUNTED FUEL ASSEMBLY INSPECTION T.V. CAMERAS

BACKGROUND OF THE INVENTION

1. Field of the Invention

The present invention relates generally to nuclear reactor facilities, and more particularly to a mounting system for a set of four television cameras upon a nuclear reactor refueling machine outer or stationary mast whereby the television cameras can readily scan reactor core fuel assemblies as the same are being vertically removed from the core by means of the refueling machine during the performance of a refueling operation so as to detect the existence, or determine the extent, of any damage to any one of the fuel assemblies or the fuel assembly grid straps, or alternatively, the television cameras can provide remote viewing of the reactor core so as to facilitate insertion of the fuel assemblies into the core during a refueling operation.

2. Description of the Prior Art

As is well known in the nuclear reactor art, fuel, conventionally in the form of pellets, is inserted within suitable cladding material, and the composite assemblage of the fuel pellets and the cladding material or casings define or form the nuclear reactor fuel rods. In turn, a predetermined number of fuel rods, assembled or secured together by means of bands called grid straps, form or define a fuel element or fuel assembly, and a predetermined number of fuel elements or fuel assemblies serve to define or form the nuclear reactor core. As a result of the normal operation of the nuclear reactor facility, the nuclear fuel within the core fuel assemblies naturally becomes depleted, and consequently, the reactor core fuel assemblies must be periodically replaced and refueled. This is achieved by means of conventional refueling operations and techniques.

In particular, the fuel within the reactor core fuel assemblies is depleted over a predetermined period of time and at a predetermined consumption rate such that once an initially new reactor facility has attained its steady state fuel consumption activity or operation through means of having undergone, for example, an initial two-year stabilization period of operation, each fuel assembly utilized within the reactor core will have a service life of three years. In lieu of refueling the entire reactor core once every three years by replacing all of the core fuel assemblies with newly fresh fuel assemblies, maintenance requirements and economic considerations have dictated that the reactor core be refueled once per year, during which period the reactor facility is of course shut down. In order to achieve or accommodate such requisite refueling operations, the reactor core is sectionalized, and the fuel supply relatively staggered between the core sections or stages. Specifically, the reactor core fuel assemblies are effectively arranged within three groups, sections, or stages, including a first, central circular section, a second intermediate annular section disposed about the first central section, and a third outermost annular section disposed about the second intermediate annular section. In addition, as a result of the aforenoted initial two-year stabilization period of operation, at the end of any subsequent one-year period of operation, the nuclear fuel disposed within the fuel assemblies of the innermost or first central section of the reactor core, which fuel assemblies have been disposed within the reactor core for an operational period of three years, will have been substantially entirely depleted. Similarly, the nuclear fuel disposed within the fuel assemblies of the second intermediate or middle section of the reactor core, which fuel assemblies have been in operational service within the reactor core for a period of only two years, will be sufficient so as to permit such fuel assemblies to provide service within the reactor core for an additional period of one year. In a like manner, the nuclear fuel disposed within the fuel assemblies of the third outermost section of the reactor core, which fuel assemblies have been in operational service within the reactor core for a period of only one year, will be sufficient so as to permit such fuel assemblies to provide service within the reactor core for an additional period of two years. In accordance with conventional refueling techniques, then, the fuel assemblies from the innermost or central section of the core are removed from the reactor core for actual refueling with fresh or new fuel, while the fuel assemblies disposed within the intermediate or middle section of the core are transferred to the first central section of the core. Continuing further, the fuel assemblies disposed within the outermost third section of the core are transferred to the second intermediate or middle section of the core, while entirely new or fresh fuel assemblies are inserted into the outermost third section of the core, thereby completing the refueling operation of the reactor facility.

It is imperative that a complete inspection of the entire external peripheral surface area of each fuel assembly and its grid straps be performed at sometime during the performance of the reactor facility refueling operation in order to detect or determine the existence of any damage to the fuel assemblies and/or the grid straps that may have possibly occurred or developed during the previous cyclic operation of the facility, in view of the obviously desirable objective of replacing damaged fuel assemblies within the reactor core so as not to present any possibility of an operational failure within the reactor facility. It is particularly desirable to be able to accomplish the foregoing fuel assembly inspection procedures during the actual refueling processing or handling sequence without considerably prolonging the refueling operation, and without the requirement of any substantial or large-scale modification of existing reactor facility refueling machine apparatus and equipment. Conventional refueling machines comprise a trolley movable within a horizontal plane along a suitable track system disposed above the reactor core at an elevational height of, for example, thirty-five feet, and a vertically disposed outer or stationary mast is fixedly mounted upon the refueling machine trolley so as to be movable therewith. The lower end of the stationary or outer mast is disposed within the reactor core cavity water, and a vertically movable inner mast or gripper tube is co-axially disposed in a relatively telescopic manner interiorly of the outer stationary mast. A gripper assembly is fixedly secured to the lower end of the inner mast or gripper tube for engaging the fuel assemblies in order to perform the aforenoted refueling operation handling sequences, during which the inner mast, the gripper assembly, and the fuel assembly, are retracted internally within the refueling machine outer mast. Conventional refueling machine apparatus and equipment does not in fact exist so as to therefore permit inspection of the fuel assemblies during the underwater handling modes of the refueling operation, and lowering of the water level within the reactor core cavity is certainly not a viable operational alternative in view of the inordinate amount of time that would be required in performance of such a procedural step, as well as performance of the various operational safety sequences attendant thereto, each time a fuel assembly is being removed from, deposited within, or transferred from one position to another position within, the reactor core.

As was noted hereinabove, conventional refueling machines include a trolley movable within a horizontal plane along a suitable track system disposed above the reactor core at an elevational height of, for example, thirty-five feet. The refueling machine operator or personnel control the refueling machine, and perform the refueling operation, from the trolley as a result of observing the reactor core and the various fuel assemblies thereof through means of a suitable viewing aperture or window defined within the refueling machine trolley deck. Consequently, during a refueling operation, when it is desired to insert a particular fuel assembly into a free space of the reactor core, such as, for example, when depositing a fresh or new fuel assembly into the outermost third section of the core or when transferring a fuel assembly from the third or second section of the core to the second or first section of the core, respectively, it may be readily appreciated that considerable difficulty may be encountered by the refueling machine operator or personnel due to the aforenoted distance between the trolley deck and the reactor core. In addition, the reactor core cavity is entirely immersed within water, and consequently, the different light refractive properties of the air environment within which the operator personnel is located and the water environment within which the fuel assemblies are located cause distortion and an apparent erroneous location of the reactor core fuel assembly spacial locations. The refueling operation is therefore considerably impeded, the efficiency of the same accordingly reduced, and the time for completion of the refueling operation correspondingly prolonged.

Accordingly, it is an object of the present invention to provide a new and improved nuclear reactor refueling machine.

Another object of the present invention is to provide a new and improved nuclear reactor refueling machine which will overcome all of the aforenoted disadvantages and drawbacks of conventional nuclear reactor refueling machines and the refueling operations characteristic thereof.

Still another object of the present invention is to provide a new and improved nuclear reactor refueling machine which will readily permit inspection of the entire external surface area of a fuel assembly for the detection and determination of any damage or defects thereof.

Yet another object of the present invention is to provide a new and improved nuclear reactor refueling machine which will readily permit inspection of the entire external surface area of a fuel assembly during a refueling handling sequence so as to detect and determine the existence of any damage or defect thereof.

Still yet another object of the present invention is to provide a new and improved nuclear reactor refueling machine which will readily permit inspection of the entire external surface area of a fuel assembly during a refueling handling sequence so as to detect and determine the existence of any damage or defect thereof, without prolonging the handling sequence and the refueling operation.

Yet still another object of the present invention is to provide a new and improved nuclear reactor refueling machine which will readily permit inspection of the entire exterior surface area of a fuel assembly during a refueling handling sequence so as to detect and determine the existence of any damage or defect thereof, without the necessity of any substantial or large-scale modification of existing refueling machine apparatus or equipment.

A further object of the present invention is to provide a new and improved nuclear reactor refueling machine which will in fact readily permit the visual inspection of the entire external surface area of a fuel assembly during a refueling handling sequence so as to detect and determine the existence of any damage or defect thereof, by means of substantially simplified modification of existing, conventional nuclear reactor refueling machines.

A yet further object of the present invention is to provide a new and improved nuclear reactor refueling machine which will readily permit the visual inspection of the entire external surface area of a fuel assembly during a refueling handling sequence so as to detect and determine the existence of any damage or defects thereof, as well as the visual monitoring of such inspection procedures by remotely located personnel.

A still further object of the present invention is to provide a new and improved nuclear reactor refueling machine which will readily permit the visual inspection of the entire external surface area of a fuel assembly during a refueling handling sequence so as to detect and determine the existence of any damage or defects thereof, as well as the tape recording of such visual inspection so as to provide a permanent record thereof.

A yet still further object of the present invention is to provide a new and improved nuclear reactor refueling machine which will greatly facilitate the alignment of the refueling machine and a fuel assembly gripped thereby, and the reactor core spacial location within which the fuel assembly is to be deposited.

A still yet further object of the present invention is to provide a new and improved nuclear reactor refueling machine which will provide the refueling machine operator or personnel with a clear and unobstructed view of the particular reactor core spacial location within which a fuel assembly is to be deposited.

An additional object of the present invention is to provide a new and improved nuclear reactor refueling machine which will permit the refueling machine operator or personnel, who is positioned at a location within the reactor facility which is remote from the reactor core, to view the particular reactor core spacial location within which a fuel assembly is to be deposited from a vantage point which is effectively within the immediate vicinity of the reactor core and the spacial location.

SUMMARY OF THE INVENTION

The foregoing and other objectives of the present invention are achieved through the provision of a nuclear reactor refueling machine which, in accordance with a first embodiment of the present invention, comprises a sleeve mounted upon the lower end of the refueling machine stationary or outer mast. Four vertically oriented television cameras are fixedly secured upon the upper end of the outer mast sleeve so as to project vertically downwardly toward the reactor core, the cameras being substantially equiangularly disposed about the refueling machine stationary mast. Four light assemblies, which project light in a substantially horizontal plane or direction transverse or perpendicular to the longitudinal axis of the refueling machine stationary mast, are secured to the lower end of the stationary mast sleeve in a similar, substantially equiangular array about the mast. Each light assembly can illuminate a sector of a fuel assembly, which is being retracted, for example, into the stationary mast by means of the inner, relatively telescopic mast or gripper tube and its associated gripper assembly, the sector being of an angular extent of at least 90°. Four mirror assemblies are also secured to the lower end of the outer mast sleeve in a substantially equiangularly array about the mast, one of the mirror assemblies being disposed directly beneath one of the television cameras, respectively and angularly separated from its respective light assembly in the circumferential direction. The mirrors are angularly oriented relative to a horizontal or vertical plane at an angle of 45°, and in this manner, the illuminated sector regions of the fuel assembly may be scanned, and the images thereof transmitted to the television cameras, as the fuel assembly is being removed from the reactor core and retracted internally within the refueling machine outer stationary mast by means of the inner mast and its associated gripper assembly. Television monitors may, in turn, be disposed upon the refueling machine operator trolley for reception of the television signals generated by the television cameras, and consequently, remote scanning of the fuel assemblies may be achieved. Video tape recording apparatus may also be operationally associated with the television monitoring equipment so as to record the scanning operations for permanent record-keeping.

In accordance with a second embodiment of the present invention, the cameras, light assemblies, and mirror assemblies are all mounted upon a basket-type structure or framework annularly disposed about the lower end of the outer stationary mast of the refueling machine, and the framework is suspendingly supported from the refueling machine trolley by means of support cables. This embodiment has operational advantages over the first embodiment in that the framework may be readily removed from the lower end of the outer stationary mast by remote control means so as to permit servicing and maintenance of the cameras, light assemblies, and mirror assemblies without necessarily lowering the water level within the reactor core cavity.

In connection with both structural arrangements or embodiments of the present invention, it is further noted that all four of the mirror assemblies may be removed from the scanning system, and the light assemblies reoriented so as to project substantially vertically downwardly in order to illuminate the reactor core. In this manner, the television camera and light system may be utilized to aid the refueling machine operator in positioning the refueling machine and a fuel assembly gripper thereby when it is desired, for example, to deposit the fuel assembly within an empty space defined within the reactor core. The camera-light systems facilitate the relative co-axial alignment of the fuel assembly with the core spacial location thereby enhancing the operational efficiency of the refueling operation.

BRIEF DESCRIPTION OF THE DRAWINGS

Various other objects, features, and attendant advantages of the present invention will be more fully appreciated as the same becomes better understood when considered in connection with the accompanying drawings, in which like reference characters designate like or corresponding parts throughout the several views, and wherein.

DESCRIPTION OF THE ILLUSTRATED EMBODIMENTS

Figure 1:
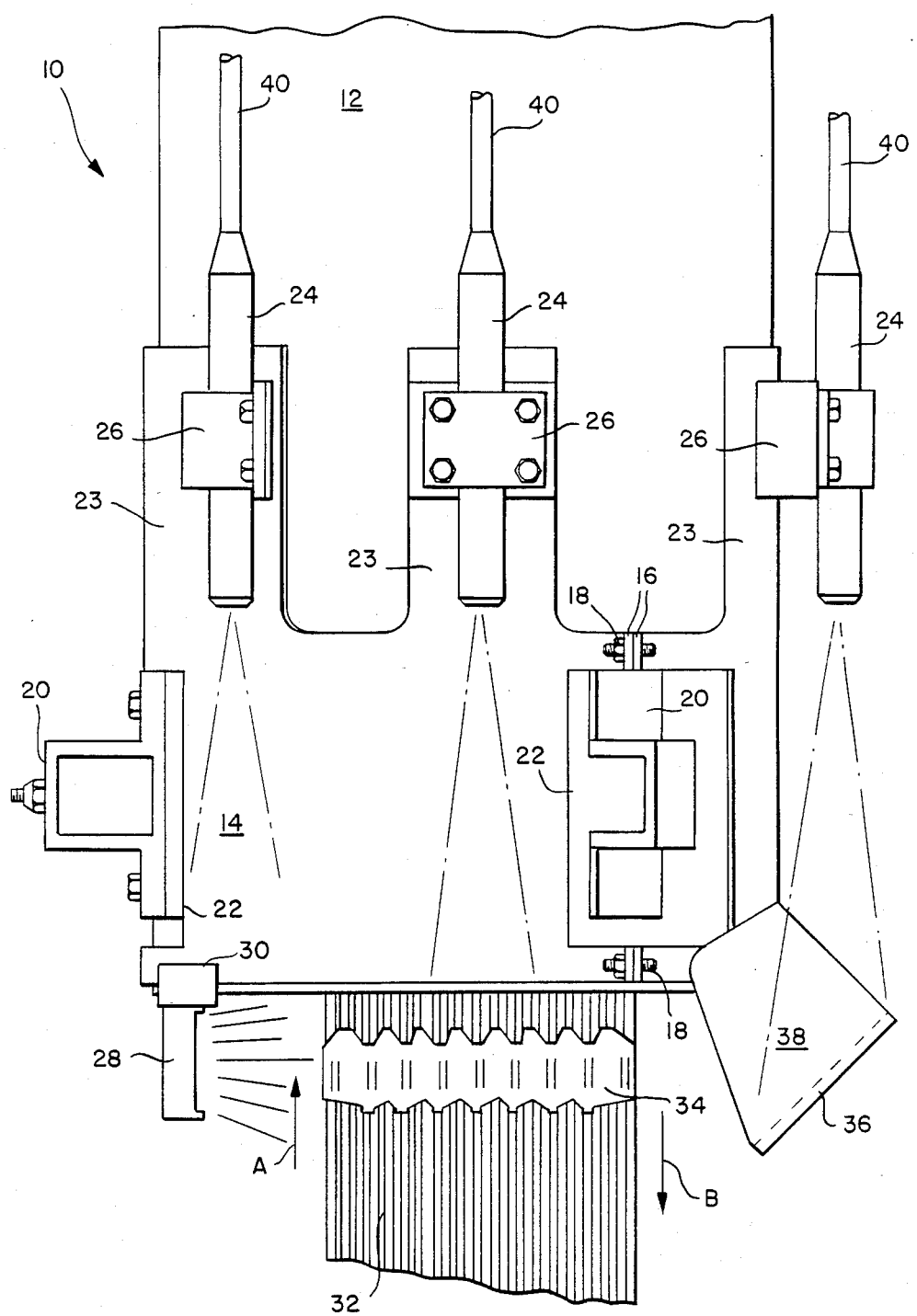
FIG. 1 is a side elevational view of a first embodiment of a new and improved nuclear reactor refueling machine constructed in accordance with the present invention and showing the cooperative parts thereof during a fuel assembly refueling scanning operation.

Referring now to the drawings, and more particularly to FIG. 1 thereof, there is shown a first embodiment of the new and improved nuclear reactor refueling machine of the present invention as generally indicated by the reference character 10. The refueling machine 10 is seen to include, in part, a vertically disposed outer stationary mast 12 upon the lower end of which there is mounted a support sleeve 14. The sleeve 14 is annularly disposed about the mast 12 so as to completely encircle the same, and flanged edge portions 16 of the sleeve 14 are secured together in a butt-contact mode by means of suitable bolt fasteners 18. The stationary mast 12 has conventionally mounted thereon three roller bracket assemblies 20 which are equiangularly disposed about mast 12 in a circumferential array, although only two of the roller bracket assemblies 20 are shown in this figure. The roller bracket assemblies 20 project radially outwardly of mast 12, and also extend radially inwardly of mast 12 so as to mount thereon suitable roller mechanisms, not shown, internally of the stationary mast 12 for operatively engaging the refueling machine inner mast or gripper tube, also not shown, for facilitating the telescopic movement of the inner mast or gripper tube relative to the outer stationary mast during performance of refueling operations. Sleeve 14 is therefore provided with suitable apertures or windows 22 so as to accommodate the locations of the roller bracket assemblies 20 when the sleeve 14 is mounted upon the stationary mast 12.

In accordance with the particularly unique features of the fuel assembly scanning system and/or fuel assembly-reactor core alignment system of the present invention, sleeve 14 has four, upwardly extending finger portions 23 upon which are respectively mounted four television cameras 24 by means of suitable brackets 26, although only three camera mounting systems are disclosed in this figure. The cameras 24 are oriented vertically with their axes disposed parallel to the axis of the stationary mast 12 and with the camera lenses oriented vertically downwardly. The cameras 24 are also disposed in a circumferential array about the stationary mast 12, and are substantially equiangularly spaced, although the accommodation of the existing roller bracket assemblies 20 of the otherwise conventional refueling machine may dictate a slight modification of the precise angular spacing or separation between adjacent television camera systems.

Each camera 24 has operatively associated therewith a respective light source 28, and consequently, the scanning system of the present invention will include four light sources 28 substantially equiangularly disposed in a circumferential array about the longitudinal axis of stationary mast 12, although only one light source 28 is shown in FIG. 1. Each light source 28 is secured to the lower end of support sleeve 14 by means of suitable brackets 30 and serves to project its light beam in a substantially horizontal direction transverse or perpendicular to the longitudinal axis of stationary mast 12 in order to illuminate a sector portion of a reactor core fuel assembly 32 of at least 90°. The fuel assembly 32 and its grid strap 34 are illustrated as being retracted into the stationary mast 12 by means of the inner mast or gripper tube, not shown, as would be the case during a refueling operation. In addition to the cameras 24 and the light assemblies 28, the scanning system of the present invention is completed by the further provision of four mirror assemblies 36 secured to the lower end of support sleeve 14 by suitable bracket assemblies 38. The mirror assemblies 36 are disposed about the axis of stationary mast 12 in a substantially equiangularly array, however, for clarity purposes, only one mirror assembly is illustrated in FIG. 1. Each of the mirror assemblies 36 is disposed directly beneath its respective television camera 24, and is inclined with respect to a horizontal plane at an angle of 45°. In this manner, the sector portion of the reactor core fuel assembly 32 illuminated by means of the corresponding light source 28 is able to be visually scanned by means of the particular mirror assembly 36 and the scanned image transmitted to the respective television camera 24. Each camera assembly 24 is of course provided with suitable power and signal cable means 40 whereby the images seen by the camera assemblies 24 as transmitted by the mirror assemblies 36 can be further transmitted to television monitors, not shown in FIG. 1, which may be located at a remote location for viewing by the refueling machine operator or personnel, such as, for example, upon the refueling machine trolley, also not shown. It is to be appreciated that while the mirror assembly 36 shown in FIG. 1 is in fact the particular mirror assembly operatively associated with the particular camera assembly 24 shown in the extreme right portion of FIG. 1, the light source assembly 28 shown in FIG. 1 is not the corresponding light source assembly for the illustrated mirror assembly 36 and the right-most camera assembly 24, but is operatively associated with the camera assembly 24 which is illustrated in the extreme left portion of FIG. 1, its corresponding mirror assembly having been omitted for clarity purposes. Similarly, the light source assembly operatively associated with the illustrated mirror assembly 36 and the right-most camera assembly 24 has also been omitted from FIG. 1 for clarity purposes. It is lastly to be appreciated that while the camera and mirror assemblies 24 and 36, respectively, are coaxially aligned, each respective light source assembly 28 is angularly offset in the circumferential direction so as to properly illuminate the particularly desired sector of the reactor core fuel assembly 32 for scanning by the respective mirror assembly 36.

In operation, it will be readily understood that during the performance of a refueling operation, the refueling machine will serve to remove a fuel assembly 32 from the reactor core, and it is desired to scan the entire external surface area of the fuel assembly 32 in order to detect or determine the existence of any damage or defects upon the fuel assembly 32 or its associated grid strap 34. The particular fuel assembly 32 may in fact be one which is to be entirely removed from the reactor core for refueling with fresh or new fuel, or simply one which is being transferred from one section of the reactor core to another section thereof. In either instance, the fuel assembly 32 will have been grasped by means of the refueling machine inner mast or gripper tube, not shown, and its associated gripper mechanisms, also not shown, and hoisted vertically out from the reactor core so as to be retracted within the outer stationary mast 12 of the refueling machine. As the fuel assembly 32 is moved vertically upwardly as denoted by arrow A, successive axial portions of the fuel assembly 32 will be continuously scanned by means of the light-mirror-camera system of the present invention whereby any defects or damage existing upon the external surface of the fuel assembly 32 or grid strap 34 will be able to be viewed by means of the refueling machine operator or personnel upon their television monitors. In view of the fact that the scanning system of the present invention includes four substantially equiangularly spaced, circumferentially arranged scanner assemblies, each capable of viewing a circumferential sector of the fuel assembly 32 of at least 90°, the entire circumferential surface area of the fuel assembly is able to be scanned.

In lieu of utilizing the camera system of the present invention for its scanning operation, or in addition to the use of such apparatus in such an operational mode, the camera system of the present invention may also be utilized to facilitate the insertion of either a new or transferred fuel assembly 32 into an awaiting spacial location within the reactor core. In accordance with such an operational mode, the mirror assemblies 36 are simply removed and the light assemblies 28 directionally re-oriented so as to project their light beams downwardly for illumination of the reactor core. In this manner, the television cameras 24 can view the illuminated core, and in particular a core space into which the fuel assembly 32 may be inserted when moved in the vertically downward direction as denoted by the arrow B.

Figure 2:
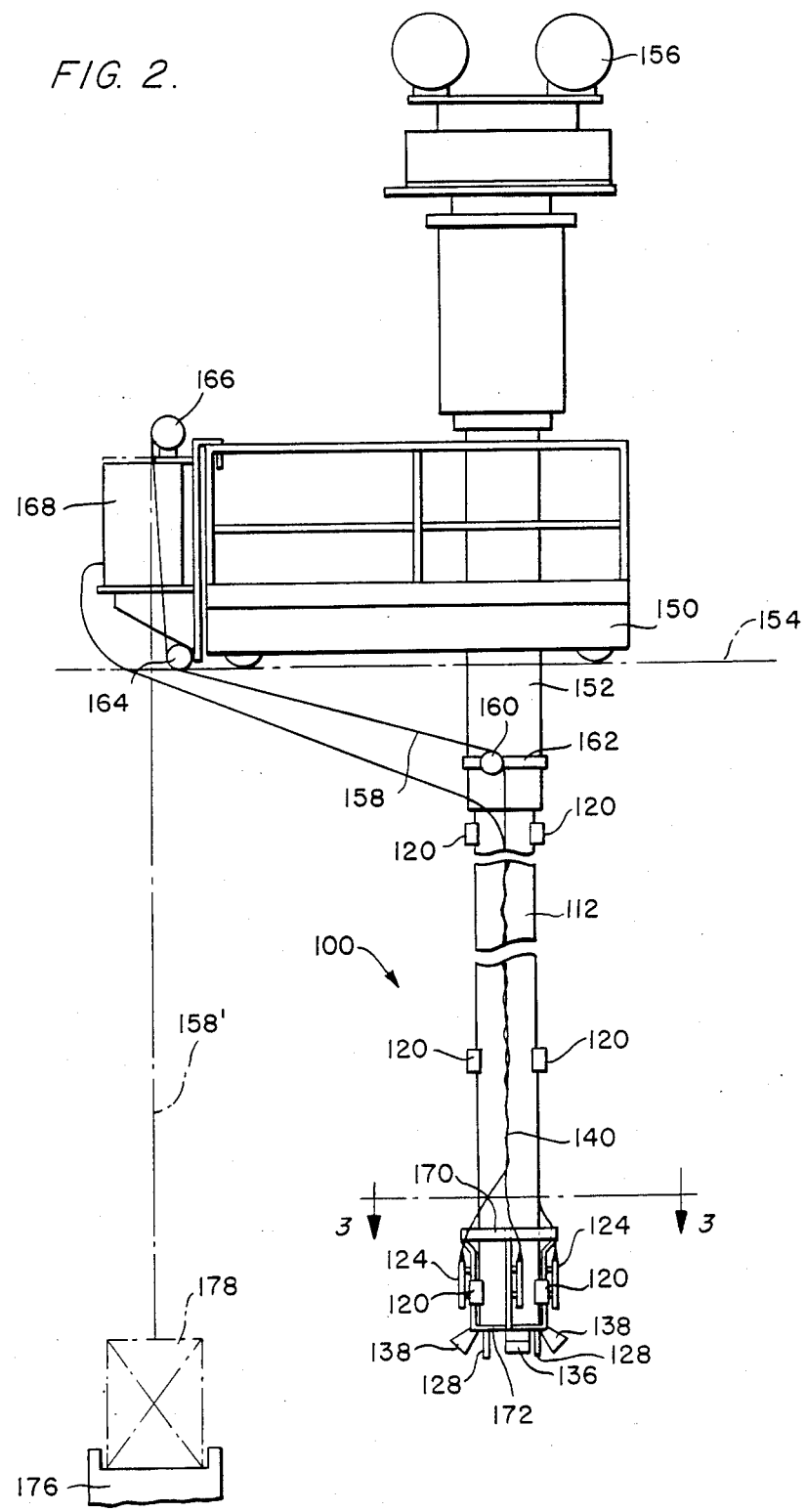
FIG. 2 is a side elevational view of a second embodiment of a new and improved nuclear reactor refueling machine constructed in accordance with the present invention and showing the cooperative parts thereof.
Figure 3:
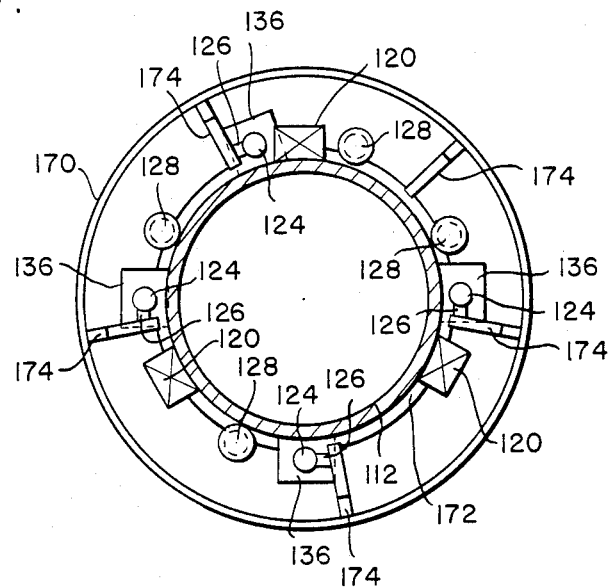
FIG. 3 is a cross-sectional view of the refueling machine of FIG. 2 as taken along the line 3—3 of FIG. 2.
Figure 4:
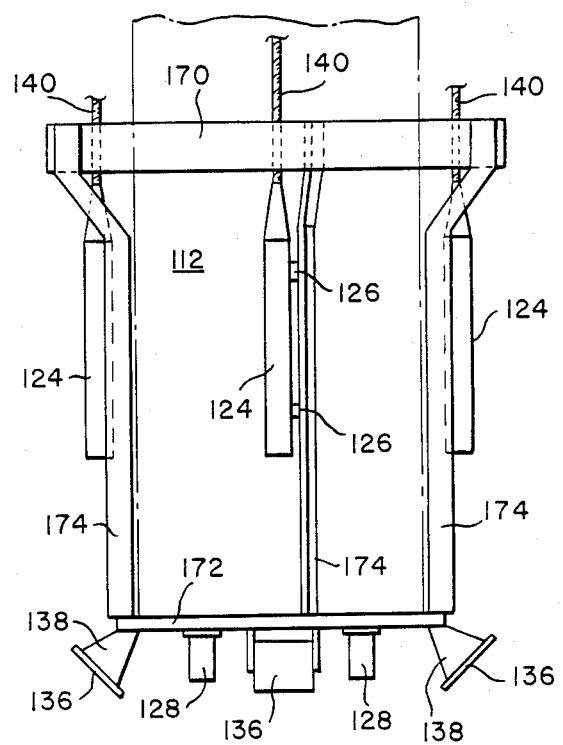
FIG. 4 is an enlarged side elevational view of the lower end of the refueling machine of FIG. 2 showing in detail the fuel assembly defect scanning system of the present invention.

Referring now to FIGS. 2-4, a second embodiment of the present invention is disclosed, and it is noted that corresponding parts of the system of FIGS. 2-4, relative to those of the system of FIG. 1, are denoted by the same reference characters except that all of the reference characters are in the 100 series. The refueling machine is generally designated by the reference character 100 and is seen to include the outer stationary mast 112 which is suspendingly supported from the refueling machine trolley 150 by means of a support mast 152. The trolley 150 is schematically illustrated as being movable along a suitable track system 154, and atop support mast 152 there is disposed the hoist drive system 156 for the inner mast or gripper tube, not shown, of the refueling machine.

In lieu of the camera, light, and mirror assemblies 124, 128, and 136, respectively, being secured to or mounted upon a support sleeve as in the first embodiment of FIG. 1, the various assemblies are mounted upon a support module or framework which is suspendingly supported upon the lower end of the refueling machine outer mast 112 by means of two stainless steel support cables 158, only one of which is shown in FIG. 2. The cables 158 are routed vertically upwardly upon opposite sides of the outer mast 112 so as to pass over a first set of sheaves 160 mounted upon the upper end of mast 112 by suitable support bands 162, and a second set of sheaves 164 mounted upon one end of the bottom deck of trolley 150. The cables 158 then continue upwardly so as to be secured to two hand-operated winches 166 which are mounted atop trolley 150. The power and signal cables 140 for the television cameras 124 are similarly routed upwardly along mast 112 by being intertwined with the support cables 158, and ultimately, cables 140 are operatively connected to the television monitors and video tape recorder apparatus disclosed at 168 upon the refueling machine trolley 150.

The basket-type support module or framework upon which the camera, light, and mirror assemblies 124, 128, and 136, respectively, are mounted is seen to include an upper annular ring member 170 circumferentially surrounding the outer mast 112, and a lower annular ring member 172 similarly circumferentially surrounding the outer mast 112, the ring members 170 and 172 being fixedly secured together by means of five substantially vertical, circumferentially spaced struts or columns 174. As best seen in FIG. 3, four of the five struts 174 serve to mount the television cameras 124 thereon by means of suitable brackets 126. It is to be readily appreciated that by means of the relatively easy movement of the basket-type framework along mast 112 as dictated by control of the winches 166 and the support cables 158, the positioning of the framework upon the lower end of mast 112 may be efficiently controlled from the remote location of the operator or personnel trolley 150. Still further, should maintenance, repair, or replacement of any one of the camera, light, or mirror assemblies 124, 128, or 136, respectively, prove to be necessary, the entire framework may be simply removed from the lower end of mast 112 and hoisted vertically upwardly out of the reactor core cavity water without the necessity of dewatering the cavity or lowering the water level thereof. In order to accomplish such an operation in a remote controlled manner, an aligning fixture or workholder 176 is disposed at a position laterally off to one side of the reactor core and at a sufficient depth below the lower end of stationary mast 112 so as to permit the basket-type framework 178 to be lowered relative to mast 112 until the same is freed therefrom. In particular, the trolley 150 would be initially moved along its track 154 until the mast 112 was co-axially aligned with fixture or workholder 176. The winch drives 166 would then be operated so as to lower the framework 178 onto the fixture or workholder 176. The support cables 158 would then be disengaged from the sheaves 160 disposed upon mast 112, and subsequently, the trolley 150 would then be moved back toward the right, as viewed in FIG. 2, toward its initial illustrated position. The winch drives 166 may then be operated so as to vertically lift the basket framework 178 out from the reactor core cavity water in order that the necessary repair, maintenance, or replacement work can be performed. Re-mounting of the framework 178 upon the mast 112 is of course to be performed in a similar but reverse operational mode.

As was the case with the first embodiment of the present invention, the mirror assemblies 136 of the second embodiment may also be removed from the framework 178 and the light assemblies 128 directionally re-oriented so as to project their light beams vertically downwardly for illumination of the reactor core in order to facilitate the insertion of a fuel assembly within an awaiting spacial location within the reactor core.

Obviously, many modifications and variations of the present invention are possible in light of the above teachings. It is therefore to be understood that within the scope of the appended claims, the present invention may be practiced otherwise than as specifically described herein.

We claim:

1. A refueling machine comprising a trolley, movable within a horizontal plane above fuel assemblies in a reactor core of a nuclear reactor facility, an outer, stationary mast fixedly mounted to said trolley and extending vertically downwardly therefrom, an inner mast coaxially mounted within said outer mast and telescopically movable therein and a gripper assembly fixedly secured to the lower end of said inner mast for attachment to said fuel assemblies for movement of said fuel assemblies into said outer mast and in and out of said reactor core, a basket-type framework surrounding the lower end of said stationary mast, a plurality of vertically mounted television cameras fixedly attached to said basket-type framework with their lenses oriented vertically downwardly, a plurality of light sources fixedly attached to said basket-type framework below said television cameras, and support cables secured to said basket-type framework for moving said basket-type framework vertically relative to said stationary mast.

2. The refueling machine as defined in claim 1, including a plurality of mirror assemblies mounted around the lower end of said stationary mast beneath a respective said television camera and inclined with respect to a horizontal plane at an angle of 45°.

3. The refueling machine as defined in claim 1 wherein four television cameras are substantially equiangularly mounted around said basket-type framework, four light sources are substantially equiangularly mounted around the lower end of said basket-type framework, four mirror assemblies are substantially equiangularly mounted around the lower end of said basket-type framework and a television monitor assembly is connected to said television cameras, so that when said gripper assembly moves a fuel assembly through said outer mast, visual inspection of the entire external surface area of said fuel assembly can be made on said television monitor assembly.

4. The refueling machine as defined in claim 1 including a workholder mounted laterally off to one side of said reactor core and at a depth below the lower end of said stationary mast, and means to lower said basket-type holder away from said stationary mast and move the same into said workholder.

* * * * *